United States Patent [19]

Sproccati et al.

[11] Patent Number: 4,699,388
[45] Date of Patent: Oct. 13, 1987

[54] VERY HIGH PRECISION SELF-CENTERING COLLET

[75] Inventors: Osvaldo Sproccati, Manno; Enrico Tettamanti, Ponte Capriasca, both of Switzerland

[73] Assignee: Tecnopinz S.A., Manno, Switzerland

[21] Appl. No.: 802,382

[22] Filed: Nov. 27, 1985

[30] Foreign Application Priority Data

Oct. 4, 1985 [CH] Switzerland .............. 4291/85

[51] Int. Cl.$^4$ ............................................. B23B 31/20
[52] U.S. Cl. ......................................... 279/48; 279/1 L
[58] Field of Search ............. 279/1 L, 41 R, 41 A, 279/42, 43, 44, 45, 16, 17, 32, 46, 47, 48, 50, 51, 52, 53

[56] References Cited

U.S. PATENT DOCUMENTS

| | | |
|---|---|---|
| 3,035,845 | 5/1962 | Benjamin ........................ 279/47 |
| 3,727,930 | 4/1973 | Anderson ........................ 279/43 |

FOREIGN PATENT DOCUMENTS

| | | | |
|---|---|---|---|
| 465428 | 5/1950 | Canada ........................... 279/43 |
| 1241229 | 5/1967 | Fed. Rep. of Germany ........ 279/41 |
| 2133153 | 7/1973 | Fed. Rep. of Germany ........ 279/41 |
| 2061565 | 12/1979 | Fed. Rep. of Germany ........ 279/42 |
| 113213 | 2/1945 | Sweden ........................... 279/46 |
| 125789 | 8/1949 | Sweden ........................... 279/42 |
| 576834 | 6/1976 | Switzerland ..................... 279/48 |
| 649242 | 5/1985 | Switzerland . |

*Primary Examiner*—Z. R. Bilinsky
*Attorney, Agent, or Firm*—Young & Thompson

[57] ABSTRACT

The self-centering collet makes it possible to obtain a very high precision which makes it possible to grip, for example, bits with a diameter less than 0.3 mm with extremely small tolerances thanks to two arrangements: the first, by depressing in the middle zone (BC) the outside conical surface (AD) of the central body of collet (1) or of collet-holder (7) so that, with the collet closed, the two complementary surfaces touch one another only in their end parts (AB and CD); the second, in making ring nut (6) press on head (1″) of central body (1) of the collet only along a circular rim (G) located near axis (EF).

1 Claim, 5 Drawing Figures

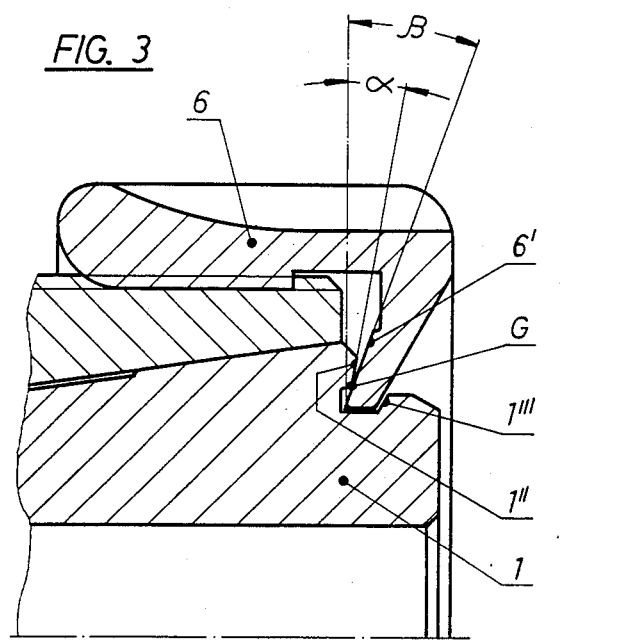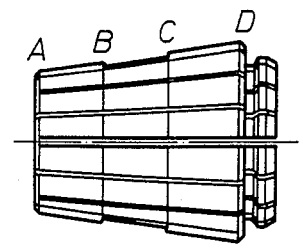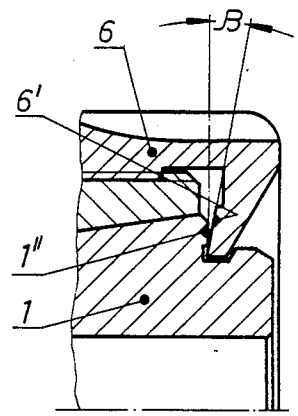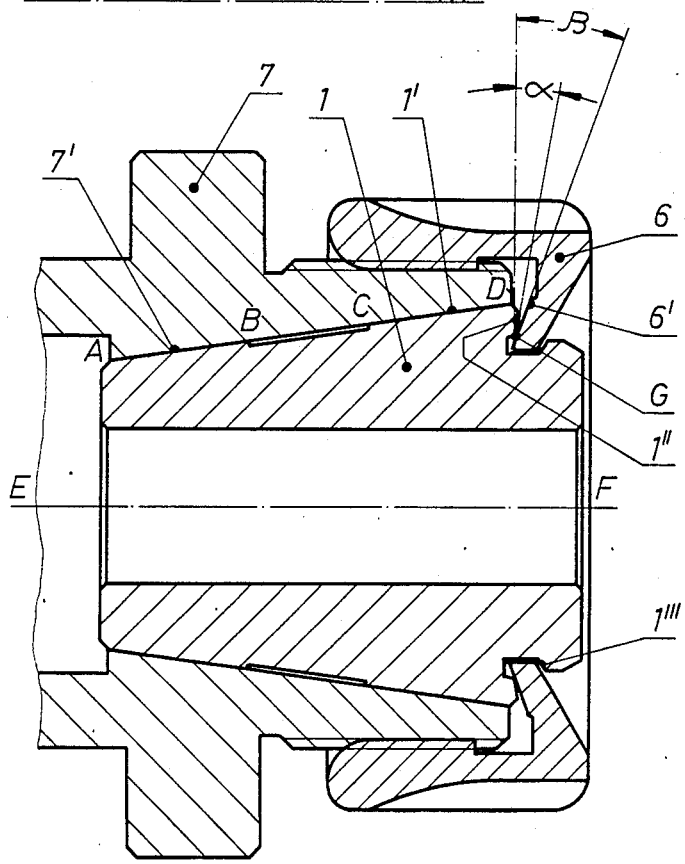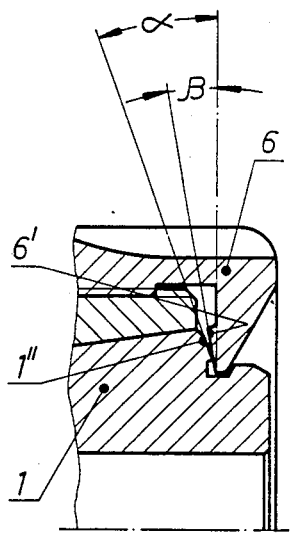

VERY HIGH PRECISION SELF-CENTERING COLLET

This invention has as its object a very high precision self-centering collet that makes it possible to grip bits or other similar tools for mechanical working, having a diameter considerably less than 0.3 mm.

It is not known to the inventors that collets able to allow such performance now exist.

The collet in question is characterized in that the outside conical surface of the central body of the collet or complementary inside surface of the collet-holder are depressed in the middle zone so that, with the collet closed, said two complementary surfaces touch one another only in their end parts and the ring nut presses on the head of the central body of the collet only along a circular rim located near the axis.

Three different modes for embodying this last characteristic of the self-centering collet are possible.

The first mode consists in making the head of the central body of the collet conical concave and that of the ring nut conical convex.

The second mode is that of making the head of the central body of the collet plane, perpendicular to the axis, i.e., radial and that of the ring nut conical convex.

The third mode consists in making the head of the central body of the collet conical convex, while that of the ring nut is conical concave.

For greater clarity the accompanying drawing represents:

In FIG. 1 a partial section of the collet in question made according to the first embodiment.

In FIG. 2 the front view of the central body of the collet.

in FIG. 3 the enlarged partial section of the collet and ring nut according to the first embodiment.

In FIG. 4 the enlarged partial section of the collet and ring nut according to the second embodiment.

In FIG. 5 the enlarged partial section of the central body of the collet and ring nut according to the third embodiment.

With reference to FIG. 1; the collet comprises central body 1, collet-holder 7 and ring nut 6.

According to the invention, outside conical surface AD of central body 1 (or optionally the complementary inside surface of collet-holder 7) is depressed in middle zone BC so that, with the collet closed, the two complementary surfaces, surface 1' of the central body and inside surface 7' of the collet-holder touch one another only in the end parts AB and CD.

In this way the consequence of possible very slight defects in making of said two surfaces 1' and 7' are eliminated.

It is precisely the perfect contact between said two complementary surfaces 1' and 7' at their ends AB and CD that makes it possible to assure the perfect coaxiality of central body 1 with respect to collet-holder 7 and therefore maximum precision.

A further characteristic of the collet in question makes it possible to increase said precision further.

Actually it is noted that possible defects in surface 6' of ring nut 6, which presses head 1" of central body 1, force central body 1 to be locked in collet-holder 7 in an imperfect coaxial position.

To avoid this, according to the invention, ring nut 6 is made to press head 1" of central body 1 only along a circular rim G located near axis EF.

For this purpose, as shown in FIG. 3, head 1" of central body 1 of the collet can be made conical concave and surface 6' of the ring nut conical convex (FIG. 3).

But it is possible, as shown in FIG. 4, to make head 1" of the central body plane and radial, i.e., perpendicular to axis EF and that of ring nut 6 conical convex.

Finally, it is possible, as shown in FIG. 5, to make head 1" of the central body of the collet conical convex and that of the ring nut conical concave.

In the first case, the angles of inclination, indicated in FIG. 3 by alpha and beta, can be 1.5° and 2°, respectively.

In the second case (FIG. 4) angle beta can be 0.5° and in the third case angle alpha can be 2° and angle beta 1.5°.

But these inclinations are given only by way of indication and are not limiting.

It is provided that the end of the head of the central body of the collet internally exhibits a bevel 1''' inclined 45° with respect to axis EF to facilitate separation of ring nut 6.

We claim:

1. In a very high precision self-centering collet, comprising a central body having an outer conical surface, a collet holder surrounding said central body and having an internal conical surface that mates with the conical surface of said central body, and a ring nut screw threadedly mounted for rotation on the collet holder and acting between the central body and the collet holder to force said conical surfaces into contact with each other; the improvement in which the central body has a circular edge defined by the intersection of two surfaces of revolution defined by two linear generatrices that intersect at a substantial angle, the ring nut having on an axially inner side thereof an annular surface whose generatrix is a straight line disposed at a substantial angle to the axis of said conical surface, said edge contacting said annular surface about a circular line disposed intermediate the width of said annular surface.

* * * * *